US006986000B2

(12) United States Patent
Yamada

(10) Patent No.: US 6,986,000 B2
(45) Date of Patent: Jan. 10, 2006

(54) INTERLEAVING APPARATUS AND DEINTERLEAVING APPARATUS

(75) Inventor: Tomohiro Yamada, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 304 days.

(21) Appl. No.: 10/239,180

(22) PCT Filed: Mar. 26, 2001

(86) PCT No.: PCT/JP01/02428

§ 371 (c)(1),
(2), (4) Date: Sep. 26, 2002

(87) PCT Pub. No.: WO01/75608

PCT Pub. Date: Oct. 11, 2001

(65) Prior Publication Data

US 2003/0061501 A1 Mar. 27, 2003

(30) Foreign Application Priority Data

Mar. 31, 2000 (JP) ............................ 2000-099596

(51) Int. Cl.
*G06F 12/00* (2006.01)

(52) U.S. Cl. ....................... 711/127; 711/137; 711/153; 711/154; 711/157; 711/165; 711/170; 714/701; 714/702; 714/763; 714/768; 714/786; 714/795

(58) Field of Classification Search ................ 711/127, 711/137, 153–154, 157, 165, 170, 173, 202, 711/204–215; 370/342, 395.3; 714/701–702, 714/763, 768, 786, 795
See application file for complete search history.

(56) References Cited

U.S. PATENT DOCUMENTS

| | | | | |
|---|---|---|---|---|
| 5,323,489 | A * | 6/1994 | Bird | 711/167 |
| 5,636,224 | A * | 6/1997 | Voith et al. | 714/701 |
| 5,991,857 | A * | 11/1999 | Koetje et al. | 711/157 |
| 6,044,468 | A * | 3/2000 | Osmond | 713/201 |
| 6,466,654 | B1 * | 10/2002 | Cooper et al. | 379/88.01 |
| 6,594,795 | B1 * | 7/2003 | Satou | 714/795 |
| 6,598,198 | B1 * | 7/2003 | Furuta et al. | 714/763 |
| 6,625,234 | B1 * | 9/2003 | Cui et al. | 375/341 |
| 2002/0053052 | A1 * | 5/2002 | Suzuki et al. | 714/702 |

FOREIGN PATENT DOCUMENTS

JP 01-296362 11/1989

(Continued)

OTHER PUBLICATIONS

Tullberg et al, May 2000, IEEE, vol. 3, 2212-2216.*

*Primary Examiner*—Donald Sparks
*Assistant Examiner*—Hashem Farrokh
(74) *Attorney, Agent, or Firm*—Armstrong, Kratz, Quintos, Hanson & Brooks, LLP

(57) ABSTRACT

A signal record reproduction device 1 of the invention comprises a microcomputer 12 and a memory 17. A series of data blocks are divided into a plurality of items of element data. The element data is interleaved and stored to the memory 17. A memory incorporated in the microcomputer 12 stores a table and a function expression for deriving address data representing an address to store each element data in memory regions positioned sufficiently apart one another in address space.

2 Claims, 6 Drawing Sheets

FOREIGN PATENT DOCUMENTS

| | | |
|---|---|---|
| JP | 04-071051 | 3/1992 |
| JP | 08-185361 | 7/1996 |
| JP | 8-329211 | 12/1996 |
| JP | 09-270785 | 10/1997 |
| JP | 10-207840 | 8/1998 |
| JP | 11-144376 | 5/1999 |

* cited by examiner

INTERLEAVING APPARATUS AND DEINTERLEAVING APPARATUS

TECHNICAL FIELD

The present invention relates to interleaving devices for interleaving a data block having a plurality of items of element data arranged on a time-series basis to shuffle time-series order of the element data and outputting its result, and to deinterleaving devices for deinterleaving a plurality of items of element data which have been interleaved and shuffled in time-series order and outputting its result.

BACKGROUND ART

A method of storage with interleaving has heretofore been known for storing confidential data.

In the method of data storage with interleave, a series of data blocks is divided into a plurality of items of element data, time-series order of the element data is shuffled, and the element data shuffled in time-series order is stored in a memory. This ensures confidentiality of the original data block.

Known for storing the data with interleave processing is a method of shuffling the time-series order of the plurality of items of element data according to a predetermined rule and storing each element data in a memory in the shuffled order, a method of calculating an address to which the element data is to be stored with use of an arithmetic operation, and a method of storing each element data to the address calculated.

A method is proposed wherein each element is stored to a corresponding address by using a table on which a random number is written as an address for every element data [JP-A No. 347076(1993)].

However, any method of the three methods stated above adopts a single data conversion rule for interleave processing, i.e., a single shuffling rule, a single arithmetic expression, or a single table. Accordingly, if the single data conversion rule is known to anyone else, the data block can be easily restored to its original by anyone else, entailing the problem of impaired reliability as to confidentiality of the data block.

An object of the present invention is to provide an interleaving device and a deinterleaving device for ensuring the high reliability as to confidentiality of the data block.

DISCLOSURE OF THE INVENTION

The present invention provides an interleaving device for interleaving a data block having a plurality of items of element data arranged on a time-series basis to shuffle time-series order of the element data and outputting its result, the interleaving device comprising:

- memory means for storing a plurality of items of element data being interleaved,
- rule storing means for, in order to convert order data representing time-series order of each element data constituting the data block to address data representing an address in the memory means, storing a plurality of data conversion rules for processing each order data for a plurality of steps of data conversion,
- data conversion means for processing each order data for a plurality of steps of data conversion according to the data conversion rules, and
- data storing means for storing each element data to a corresponding address in the memory means based on the address data as to each order data obtained by the steps of data conversion processing.

A plurality of data conversion rules storage portions provided with the rule storing means comprise memory regions of physically different memory chips, or comprise a plurality of memory regions positioned apart one another in address space of the same memory chip.

With the interleaving device of the present invention, the order data arranged in a regular order is processed for the plurality of steps of data conversion, to obtain address data representing irregular address arrangement. Each element data constituting the data block is stored to such irregular address, so that even if element data is read out from the memory means and arranged in an order of address, the data block is not restored to its original, whereby the data content cannot be decoded.

The plurality of data conversion rules, as described above, are necessary to read out from the memory means the plurality of items of element data stored and to restore the data block to its original. The plurality of data conversion rules are stored in the memory regions of physically different memory chips, or in a plurality of memory regions positioned apart one another in address space of the same memory chip, so that it is difficult for someone else to know all the data conversion rules. Even though one data conversion rule is known to anyone else, the data block cannot be restored to its original by the one data conversion rule. Thus the data storage method of the invention ensures higher reliability as to the confidentiality of the data block than the conventional method.

Stated specifically, the rule storing means stores a random number table for storing a random number sequence, and a function expression wherein input data is a variable. The data conversion means comprises first conversion means for reading out a random number of order corresponding to order data from the random number table and second conversion means for performing the operation based on the function expression with input data of the random number read out from the random number table and calculating address data.

According to the specific construction, the order data arranged in the regular order is each processed for data conversion using the random number table, to obtain data having excellent randomness. Each data is processed for calculation based on the function expression, having each data converted further, to obtain address data which cannot be guessed from the original order data.

The present invention provides a deinterleaving device for deinterleaving a plurality of items of element data which have been shuffled in time-series order resulted from interleave processing of a data block having the element data arranged on a time-series basis and outputting its result, the deinterleaving device comprising:

- memory means for storing a plurality of items of element data being interleaved,
- rule storing means for, in order to convert order data representing time-series order of each element data constituting the data block to address data representing an address in the memory means, storing a plurality of data conversion rules for processing each order data for a plurality of steps of data conversion,
- data conversion means for processing each order data for a plurality of steps of data conversion according to the data conversion rules, and data reading means for reading out element data from a corresponding address in the memory means based on address data as to each order data obtained by the steps of data conversion processing, and restoring the data block to its original. A plurality of data conversion rules storage portions provided with the rule storing means comprise memory regions of physically different memory chips, or comprise a plurality of memory regions positioned apart one another in address space of the same memory chip.

With the deinterleaving device of the invention, each element data constituting the data block is interleaved by the interleaving device described, and is stored in a predetermined address of the memory means, i.e. an address which is represented by the address data obtained by the steps of data conversion processing to the order data as to each element data.

Thus the steps of data conversion processing are conducted to the order data as to each element data, to obtain address data representing an address to which each element data is stored. Element data is read out from an address represented by the address data thus obtained, arranging the element data read out, thereby restoring to its original the data block having a plurality of element data arranged in time-series order.

As described above, a plurality of data conversion rules are necessary to restore the data block to its original. The plurality of data conversion rules are stored in the memory regions of physically different memory chips, or a plurality of memory regions positioned apart one another in address space of the same memory chip, so that it is difficult for someone else to know all the data conversion rules. Even though one data conversion rule is known to anyone else, the data block cannot be restored to its original with the one data conversion rule. Thus the data storage method of the invention ensures higher reliability as to the confidentiality of the data block than the conventional method described above.

Stated specifically, the rule storing means stores a random number table for storing a random number sequence, and a function expression wherein input data is a variable. The data conversion means comprises first conversion means for reading out a random number of order corresponding to order data from the random number table and second conversion means for performing the calculation based on the function expression with input data of a random number read out from the random number table and calculating address data.

Thus the plurality of element data being interleaved with use of the random number table and the function expression of the interleaving device can be restored to the data block having the original time-series.

As described above, the present invention provides an interleaving device and deinterleaving device which ensures high reliability as to the confidentiality of the data block.

BEST MODE OF CARRYING OUT THE INVENTION

With reference to the drawings, an embodiment of the present invention will be described in detail.

In recent years music data compressed in MP 3 (MPEG AUDIO LAYER-3) format or AAC (ADVANCED AUDIO CODING) format is available on the Internet.

Figure 1:
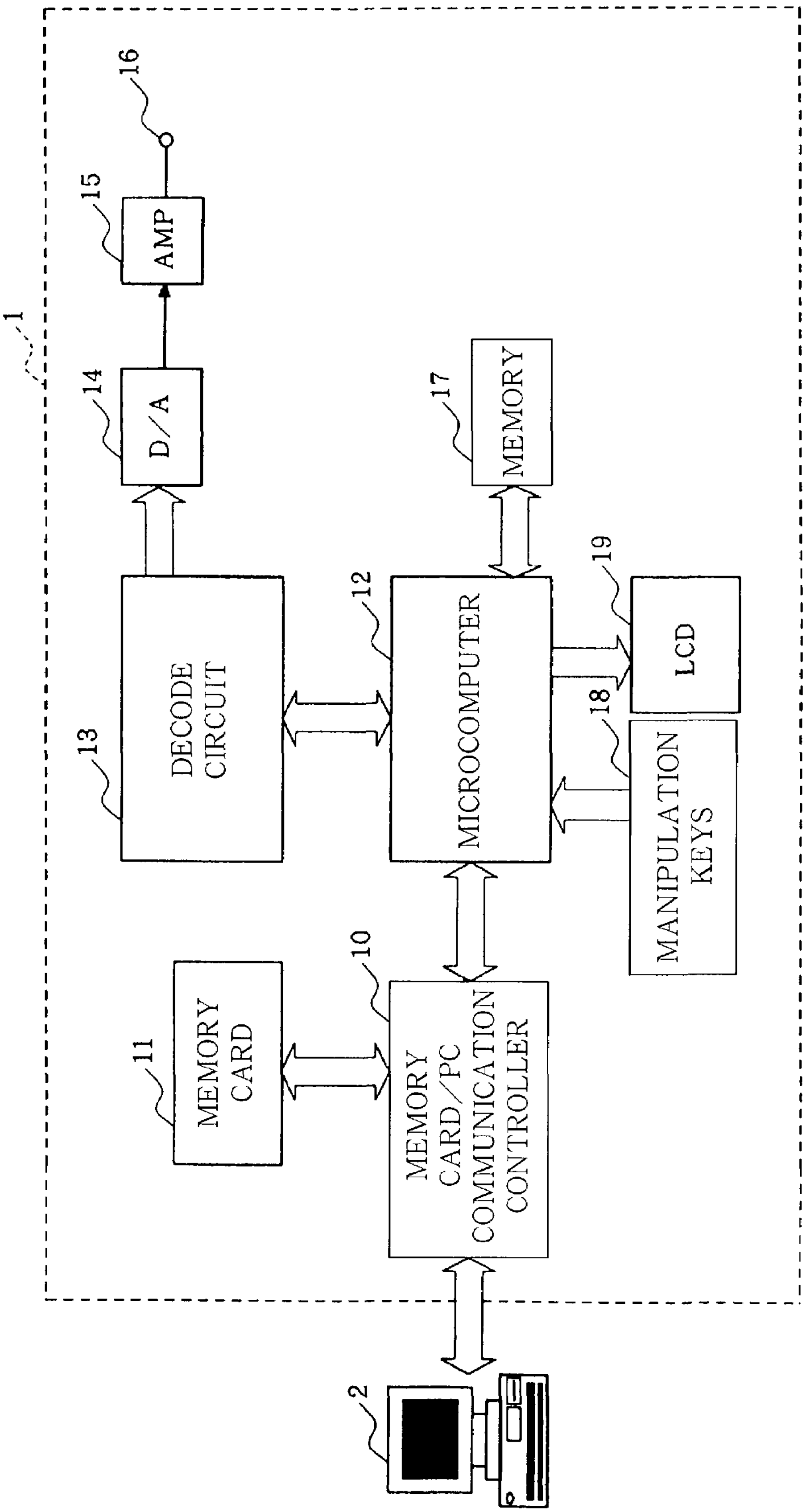
FIG. 1 is a block diagram showing the construction of a signal record reproduction device embodying the invention.

A portable signal record reproduction device 1 shown in FIG. 1 can be connected to a personal computer 2, and music data is downloaded from the Internet to the computer 2. The device 1 can receive the music data downloaded from the Internet to the computer 2 with the device connected to the computer 2, and can record the received music data in a memory card 11.

The computer 2 only downloads sound data authenticated for reproduction by a distributor. Added to music data downloaded is authentication data for indicating that the music data is authenticated for reproduction with the signal record reproduction device 1. After the authentication data is processed for encryption such that only the signal record reproduction device 1 can decrypt the data encrypted, the music data and the authentication data encrypted are transferred to the signal record reproduction device 1.

With the signal record reproduction device 1, the music data and the authentication data transferred from the computer 2 are recorded in the memory card 11.

When the user selects one music data to reproduce it, one main encryption key is decrypted to decrypt a plurality of sub encryption keys with use of the main encryption key. The authentication data added to the music data selected by the user is thereafter decrypted with use of the sub encryption keys, judging whether the music data is authenticated for reproduction with the device based on the result of decoding of the authentication data. Only if the music data is authenticated for reproduction with the device, the music data is reproduced to deliver outside the reproduced sound through a headset (not shown).

Even if the other signal record reproduction device is connected to the computer 2 receiving music data and authentication data from the computer 2 to record the data stated in the memory card, an incorporated memory does not have stored therein the sub encryption keys for decrypting the authentication data and the one main encryption key for decrypting the sub encryption keys, so that the authentication data cannot be decoded and the music data cannot be reproduced.

Accordingly the music data can be reproduced only by the signal record reproduction device 1 of a person who is authenticated for reproduction of the music data, whereby copyright of the distributor of the music data is protected.

The other signal record reproduction device described can reproduce the music data if the other device obtains the main encryption key and the sub encryption keys of the signal record reproduction device 1 to decrypt the sub encryption keys with use of the main encryption key, thereafter restoring the authentication data with use of the sub encryption keys, further obtaining an identification number of the signal record reproduction device 1 which will be stated below.

Accordingly ensuring the confidentiality of the main encryption key is necessary for the secure protection of copyright of the music data distributor.

In this embodiment, the present invention is embodied into interleave processing and deinterleave processing for the main encryption key, to securely protect copyright of the music data distributor.

First the construction and the operation of the personal computer 2 and the signal record reproduction device 1 will be specifically described, respectively, and then interleave processing and deinterleave processing for the main encryption key will be specifically described.

The personal computer 2 is provided with data management software having a function of downloading only music data authenticated for reproduction by a distributor, a function of communicating with a signal record reproduction device of a person who is authenticated for reproduction of music data, and a function of adding authentication data to the music data downloaded and encrypting the authentication data.

Figure 6:
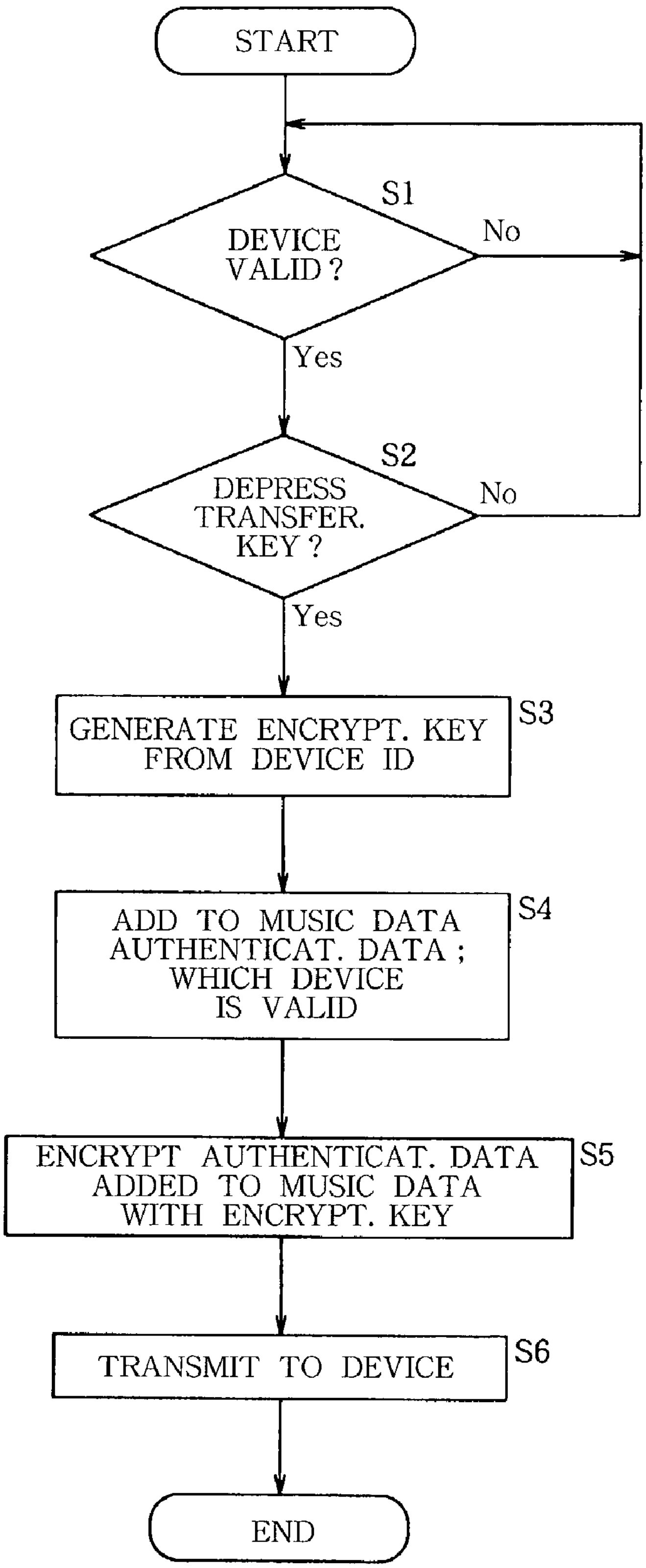
FIG. 6 is a flow chart showing a data transferring procedure to be performed by the personal computer.

FIG. 6 shows a data transferring procedure to be performed by the personal computer 2. A memory (not shown) incorporated in the computer 2 has stored therein an identification number of the signal record reproduction device 1 (Device ID).

A signal record reproduction device is connected to the computer 2, as illustrated, first in step S1 an inquiry is made as to whether the signal record reproduction device that has been connected is valid based on the identification number stored in the memory incorporated, i.e., as to whether the signal record reproduction device that has been connected is the signal record reproduction device 1. If the answer is the negative, the same inquiry is repeated in step S1. On the other hand, when the answer is the affirmative, step S2 follows.

In step S2 an inquiry is made as to whether a transferring key provided with the signal record reproduction device 1 is manipulated. When the inquiry is answered in the negative, step S1 follows again.

Figure 2:
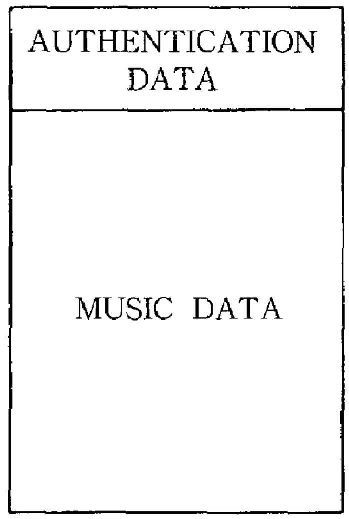
FIG. 2 is a diagram showing the construction of music data and authentication data to be transferred from a personal computer to the signal record reproduction device.

If the user depresses the transferring key to transfer desired music data to the signal record reproduction device, the answer for step S2 is answered in the affirmative, followed by step S3 wherein an encryption key is generated for encrypting authentication data based on the identification number stored in the memory incorporated, as will be described below. Thereafter in step S4 the authentication data is added to the music data selected by the user as shown in FIG. 2.

Subsequently in step S5 the authentication data is encrypted with use of the encryption key prepared in step S3. In step S6 the music data and the authentication data encrypted are transferred to the signal record reproduction device 1 to complete the procedure.

With the procedure described, the sound data downloaded on the Internet and the authentication data encrypted are transferred to the signal record reproduction device 1.

On the other hand, the signal record reproduction device 1 is provided with a memory card/PC communications controller 10 for communicating with the computer 2 and writing and reading data for the memory card 11, as shown in FIG. 1. The controller 10 receives the music data and the authentication data transferred from the computer 2, as described above, writing the music data and the authentication data in the memory card 11.

The controller 10 is connected to the microcomputer 12. Connected to the microcomputer 12 are a nonvolatile rewritable memory 17, e.g. EEPROM, manipulation keys 18 and a LCD 19. Stored in the memory 17 are, as described above, a plurality of sub encryption keys for decrypting the authentication data that has been encrypted and a main encryption key for encrypting the sub encryption keys and decrypting the sub encryption keys that have been encrypted.

When the user selects one music data to depress a reproduction key, the microcomputer 12 decrypts the main encryption key with a method described below, decrypting the sub encryption keys with use of the main encryption key that has been decrypted. Thereafter, the authentication data added to the music data is decrypted with use of the sub encryption keys to decode the authentication data, as described above. Based on the decode result an inquiry is made as to whether the music data selected by the user is authenticated for reproduction.

If the music data selected by the user is authenticated for reproduction, the microcomputer 12 gives the memory card/PC communications controller 10 a reading command for the music data.

The memory card/PC communications controller 10 is given the reading command by the microcomputer 12 to read out the music data from the memory card 11 to feed the music data to the microcomputer 12.

The music data fed to the microcomputer 12 is first fed to a decode circuit 13 and is given predetermined signal processing such as decompression processing. Thereafter the music data is fed to an analogue conversion circuit 14 to be converted to analogue audio signals. The analogue audio signals are fed to an amplifier circuit 15 to be amplified, and thereafter the signals are fed to a headset (not shown) via a headset terminal 16 and delivered outside as sound through the headset.

In this way only the music data that has been authenticated for reproduction is reproduced.

Figure 4:
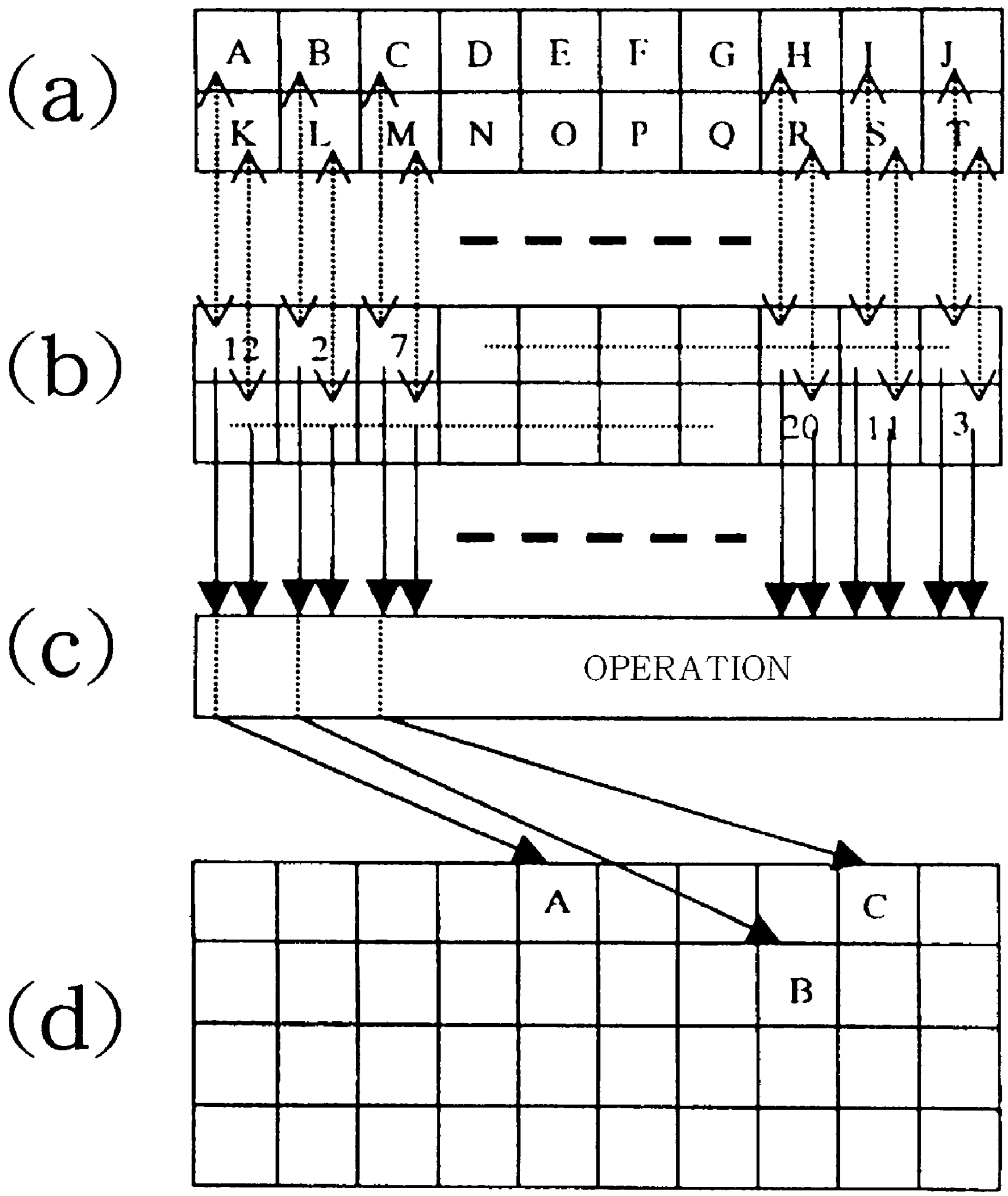
FIG. 4 is a diagram for illustrating a method for interleaving a main encryption key.
Figure 5:
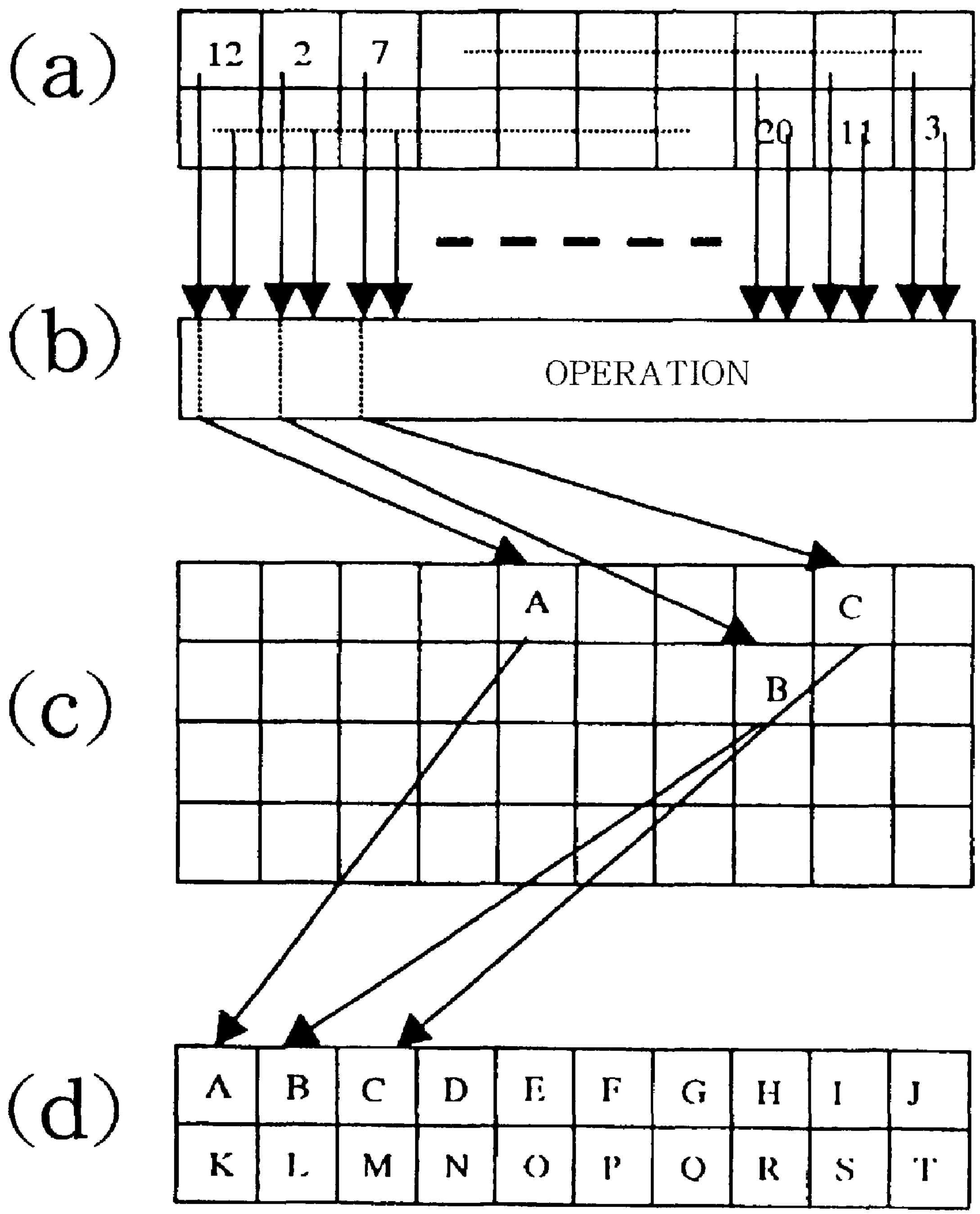
FIG. 5 is a diagram for illustrating a method for deinterleaving the main encryption key.

With reference to FIGS. 4 and 5, interleave processing and deinterleave processing for the main encryption key which is a characteristic of the signal record reproduction device 1 embodying the invention will be described below.

Figure 3:
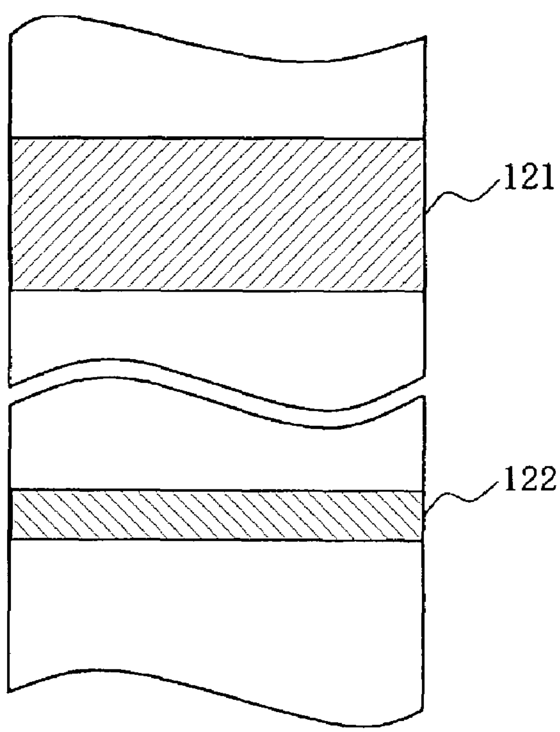
FIG. 3 is a diagram showing a signal recording format of a flash memory incorporated in a microcomputer.

In the interleave processing, a data block representing the main encryption key is divided into a plurality of items of element data (A to T) each having data amount of 1 byte, as shown in FIG. 4(*a*). Address data representing an address to which each element data is to be stored is derived with use of a table and a function expression. The flash memory (not shown) incorporated in the microcomputer 12 stores the table and the function expression in two memory regions 121, 122 positioned sufficiently apart one another in address space as shown in FIG. 3.

Stored in the table are random numbers having the same number as that of the element data constituting the data block of the main encryption key, as shown in FIGS. 4(*b*) and 5(*a*). The random numbers are generated by a random number generator, and are transferred from the random number generator to the microcomputer 12, and are written to the flash memory.

On the other hand, address data is calculated from the function expression wherein a random number stored in the table is a variable X. (for example, Y=aX+b, a, b: constant value)

In interleave processing, with respect to each element data constituting the data block of the main encryption key, a random number stored in the same order as that of each element data is read out from the table shown in FIG. 4(*b*). Thereafter, an operation is performed with the function expression wherein a random number read out is a variable to calculate address data, as shown in FIG. 4(*c*). Each element data is stored to an address represented by the address data calculated, as shown in FIG. 4(*d*)

For example, with respect to the third element data C, the third random number "7" is read out from the table shown in FIG. 4(*b*), and then an operation is performed with the function expression wherein a random number is a variable to calculate address data, storing the element data C to an address represented by the address data calculated.

In interleave processing described, with respect to a plurality of items of element data (A to T) constituting the data block of the main encryption key, the random numbers having excellent randomness are obtained from the table shown in FIG. 4(*b*). The random numbers are each processed for the operation with the function expression, to calculate address data to be given further data conversion, storing the element data (A to T) to addresses represented by the address data, respectively.

In this way, time-series order of the element data constituting the data block of the main encryption key is random shuffled, as shown in FIG. 4(*d*), and are stored in the memory 17.

In deinterleave processing, the first random number "12" is read out from a table shown in FIG. 5(*a*), and an operation is performed with the function expression wherein a random number read out is a variable, as shown in FIG. 5(*b*) to calculate address data. Element data A is read out, which is stored to an address represented by the address data calculated as shown in FIG. 5(*c*). Subsequently the second random number "2" is read out from the table shown in FIG. 5(*a*), and an operation is performed with the function expression wherein a random number read out is a variable, as shown in FIG. 5(*b*) to calculate address data. Element data B is read out, which is stored to an address represented by the address data calculated as shown in FIG. 5(*c*).

In the same manner as the above, the operation is repeated as follows: the random numbers are sequentially read out from the table shown in FIG. 5(*a*) according to a storing order, to obtain address data by processing the random number read out for the operation with the function expression, reading out element data based on an address represented by the address data obtained. The element data thus obtained are arranged according to an order of read-out from the table. In the interleave processing described above, a random number that is stored in the same order as that of each element data is read out from the table shown in FIG. 4(*b*), so that element data are arranged according to an order of read-out from the table of FIG. 5(*a*), thereby obtaining an original data block wherein the element data (A to T) are arranged in time-series order as shown in FIG. 5(*d*).

Figure 7:
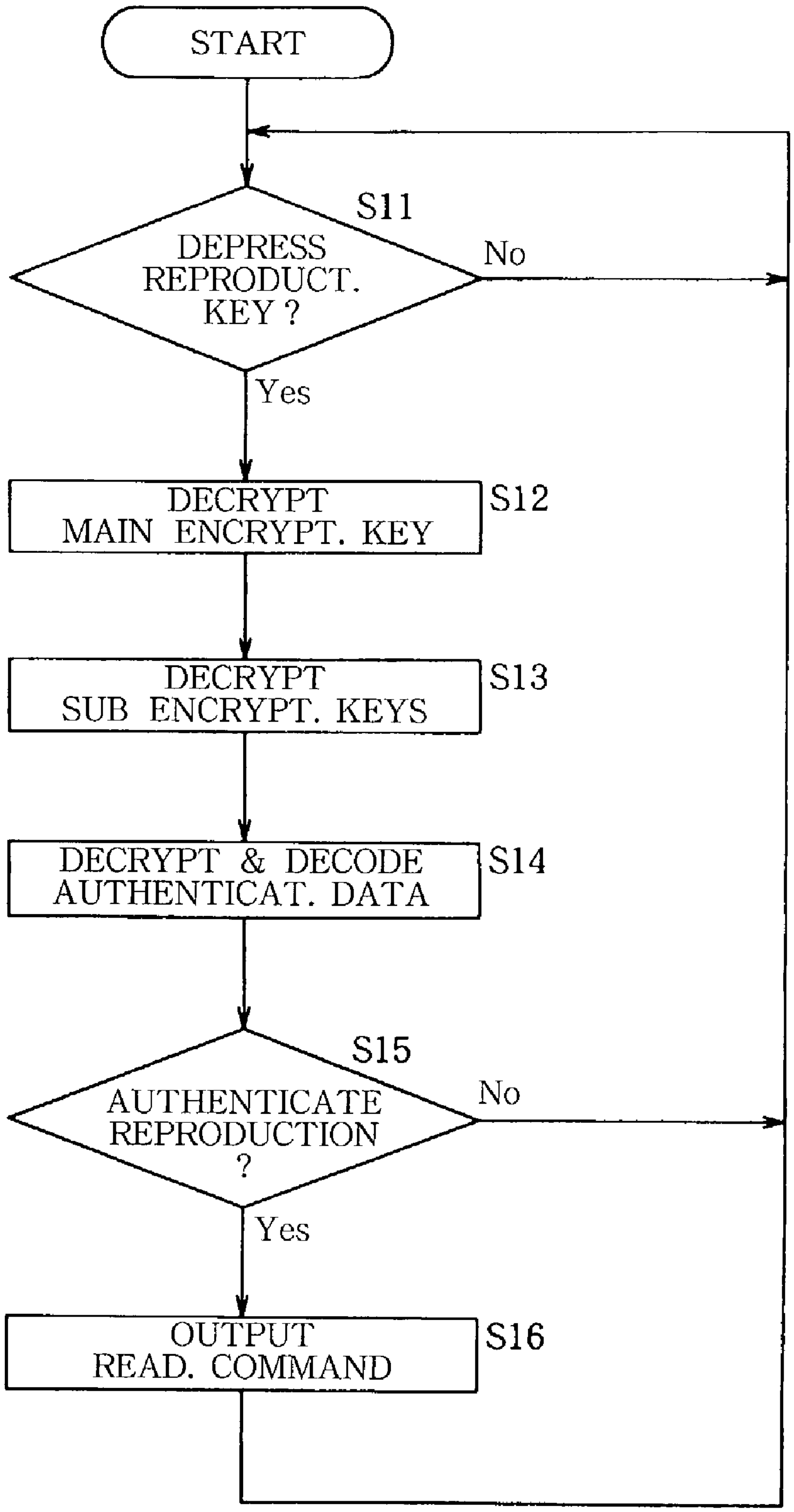
FIG. 7 is a flow chart showing a music data reproducing procedure to be performed by the microcomputer of the signal record reproduction device.

FIG. 7 shows the music data reproducing procedure to be performed by the microcomputer 12 of the signal record reproduction device 1.

As illustrated, first in step S11 an inquiry is made as to whether a reproduction key is manipulated. If the answer is the negative, the same inquiry is repeated in step S11.

On the other hand, when the user selects one music data from among a plurality of items of music data recorded in the memory card 11 to depress the reproduction key, the answer for step S11 is answered in the affirmative, followed by step S12 wherein the main encryption key is decrypted according to the method described.

Subsequently in step S13 a plurality of sub encryption keys are decrypted with use of the main encryption key, followed by step S14 wherein with use of the sub encryption keys, authenticated data added to the music data is decrypted and decoded.

In step S15 an inquiry is made as to whether based on the decoded result stated above, the music data selected by the user is authenticated for reproduction with the device 1. When the answer is the negative, the sequence returns to step S11. On the other hand, when the answer is the affirmative, step S16 follows to give a reading command to a memory card/PC communications controller 10, and then the sequence returns to step S11. The memory card/PC communications controller 10 with the command given reads out the music data selected by the user from the memory card 11. As a result the music data selected by the user is delivered outside as sound through the headset.

With the procedure described, only the music data that the distributor authenticates for reproduction with the device 1 is reproduced.

With the signal record reproduction device 1, the table and the function expression used in the interleave processing and deinterleave processing of the main encryption key are each stored in the two memory regions 121, 122 positioned sufficiently apart one another in address space of a flash memory incorporated in a microcomputer, so that it is difficult for someone else to know both the table and the function expression. Even if a single data conversion rule of one of the table and the function expression is known to anyone else, the data block of the main encryption key cannot be restored with the single data conversion rule. Thus the data storing method ensures the higher reliability as to confidentiality of the data block than the conventional method.

The data block of the main encryption key is interleaved with use of one table and one function expression according to the example described, whereas the method is not limitative; the block can be interleaved with use of two tables or with use of two function expressions. Alternatively, the number of the data conversion rules is not limited to two; three or more data conversions rules is also usable.

Furthermore, the table and the function expression are stored in two memory regions 121, 122 positioned apart one another in address space of the same flash memory according to the example described, whereas the construction is not limitative; the table and the function expression can be each stored in memory regions of physically different two memory chips.

The invention claimed is:

1. An interleaving device for interleaving a data block having a plurality of items of element data arranged on a time-series basis to shuffle time-series order of the element data and outputting its result, the interleaving device comprising:

memory means for storing a plurality of items of element data being interleaved, rule storing means for storing a random number table for storing a random number sequence and a function expression wherein input data is a variable, first conversion means for reading out from the random number table a random number of order corresponding to order data representing time-series order of each element data constituting the data block, second conversion means for performing an operation based on the function expression with input data of the random number being read out from the random number table and calculating address data representing an address in the memory means, and data storing means for storing each element data to a corresponding address in the memory means based on the address data as to each order data being calculated by the second conversion means, the interleaving device being characterized in that the rule storing means comprises memory regions of two physically different memory chips or comprises two rule storing portions comprising two memory regions positioned apart each other in address space of the same memory chip, and one of the rule storing portions stores the random number table, and the other of the rule storing portions stores the function expression.

2. A deinterleaving device for deinterleaving a plurality of items of element data which have been shuffled in time-series order resulted from interleave processing of a data block having the element data arranged on a time-series basis and outputting its result, the deinterleaving device comprising:

memory means for storing a plurality of items of element data being interleaved, rule storing means for storing a random number table for storing a random number sequence and a function expression wherein input data is a variable, first conversion means for reading out from the random number table a random number of order corresponding to order data representing time-series order of each element data constituting the data block, second conversion means for performing an operation based on the function expression with input data of the random number being read out from the random number table and calculating address data representing an address in the memory means, and data reading means for reading out element data from a corresponding address in the memory means based on the address data as to each order data being calculated by the second conversion means and restoring the data block to its original, the deinterleaving device being characterized in that the rule storing means comprises memory regions of two physically different memory chips or comprises two rule storing portions comprising two memory regions positioned apart each other in address space of the same memory chip, and one of the rule storing portions stores the random number table, and the other of the rule storing portions stores the function expression.

* * * * *

UNITED STATES PATENT AND TRADEMARK OFFICE

CERTIFICATE OF CORRECTION

PATENT NO. : 6,986,000 B2 
DATED : January 10, 2006
INVENTOR(S) : Tomohiro Yamada It is certified that error appears in the above-identified patent and that said Letters Patent is hereby corrected as shown below:

Title page, Item [54] and Column 1, line 1,
Title, should be -- INTERLEAVING DEVICE AND DEINTERLEAVING DEVICE --.

Signed and Sealed this

Sixth Day of June, 2006

JON W. DUDAS
*Director of the United States Patent and Trademark Office*